(12) United States Patent
Bafile et al.

(10) Patent No.: US 12,709,530 B2
(45) **Date of Patent: *Aug. 18, 2026**

(54) SCISSOR LIFT DESCENT CONTROL SYSTEMS AND METHODS

(71) Applicant: Oshkosh Corporation, Oshkosh, WI (US)

(72) Inventors: Louis Bafile, Oshkosh, WI (US); Eko Prasetiawan, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 364 days.

This patent is subject to a terminal disclaimer.

(21) Appl. No.: 18/584,784

(22) Filed: Feb. 22, 2024

(65) Prior Publication Data

US 2024/0190688 A1 Jun. 13, 2024

Related U.S. Application Data

(63) Continuation of application No. 16/811,851, filed on Mar. 6, 2020, now Pat. No. 11,945,704.

(Continued)

(51) Int. Cl.
*B66F 17/00* (2006.01)
*B66F 7/06* (2006.01)

(Continued)

(52) U.S. Cl.
CPC .......... *B66F 17/006* (2013.01); *B66F 7/0625* (2013.01); *B66F 7/0666* (2013.01);

(Continued)

(58) Field of Classification Search
CPC .... B66F 17/006; B66F 7/0625; B66F 7/0666; B66F 11/04; B66F 11/044; B66F 11/042;

(Continued)

(56) References Cited

U.S. PATENT DOCUMENTS 353,829 A 12/1886 Sprague
2,224,529 A 12/1940 Thompson et al.

(Continued)

FOREIGN PATENT DOCUMENTS

CA 2887919 A1 12/2011
CN 101229880 A 7/2008

(Continued)

OTHER PUBLICATIONS

International Search Report and Written Opinion for International Application No. PCT/US2020/021538 dated Jul. 7, 2020, 17 pps.

(Continued)

*Primary Examiner* — Daniel P Cahn
*Assistant Examiner* — Shiref M Mekhaeil
(74) *Attorney, Agent, or Firm* — Foley & Lardner LLP

(57) ABSTRACT

A lift device comprises a base, a retractable lift mechanism, a work platform, a linear actuator, an electromagnetic brake, and a manual release device. The electromagnetic brake is movable between an engaged position and a disengaged position. In the event of a power failure, the electromagnetic brake is biased toward and engaged position, where an armature is biased away from a magnetic body and into contact with a friction disk by at least one engagement spring, thereby preventing rotation of the friction disk. In a disengaged position, a current is applied to the wire coil to produce an electromagnetic force on the armature that overcomes a spring force of the at least one engagement spring, thereby compressing the at least one engagement spring, pulling the armature out of contact with the friction disk, and allowing the rotation of the friction disk.

20 Claims, 14 Drawing Sheets

Related U.S. Application Data

(60) Provisional application No. 62/830,164, filed on Apr. 5, 2019.

(51) Int. Cl.
*B66F 11/04* (2006.01)
*F16D 55/02* (2006.01)
*F16D 59/00* (2006.01)
*F16D 65/18* (2006.01)
*H02K 7/06* (2006.01)
*F16D 121/22* (2012.01)
*F16D 127/00* (2012.01)
*F16D 127/04* (2012.01)

(52) U.S. Cl.
CPC .............. *B66F 11/04* (2013.01); *F16D 55/02* (2013.01); *F16D 59/00* (2013.01); *F16D 65/186* (2013.01); *H02K 7/06* (2013.01); *B66F 11/042* (2013.01); *B66F 11/044* (2013.01); *F16D 2121/22* (2013.01); *F16D 2127/002* (2013.01); *F16D 2127/04* (2013.01)

(58) Field of Classification Search
CPC ........ F16D 55/02; F16D 59/00; F16D 65/186; F16D 2121/22; F16D 2121/20; F16D 2121/24; F16D 2121/28; F16D 2127/002; F16D 2127/04; H02K 7/06
See application file for complete search history.

(56) References Cited

U.S. PATENT DOCUMENTS 2,558,885 A * 7/1951 Stevens .................. F16D 59/00 57/78
2,894,605 A * 7/1959 Leavitt ..................... B66F 9/06 182/103
2,944,689 A * 7/1960 Arnot ................. B66F 9/07586 414/607
3,301,532 A * 1/1967 Lock ....................... B66D 3/12 60/407
3,596,735 A * 8/1971 Denier ................. B66F 11/042 182/69.5
3,693,755 A * 9/1972 Terayama ................ E06C 5/36 212/230
3,741,337 A * 6/1973 Visinsky .............. B66F 11/044 182/148
3,817,346 A 6/1974 Wehmeyer
RE28,455 E * 7/1975 Denier ..................... B66F 3/22 182/69.5
3,957,137 A * 5/1976 Vermette .................. B66B 9/16 187/222
3,983,960 A * 10/1976 Sikli .................... B66F 11/042 187/269
4,113,065 A * 9/1978 Sikli .................... B66F 11/042 187/269
4,175,644 A * 11/1979 Sikli ........................ B66F 3/22 187/269
4,313,517 A 2/1982 Pivar
4,476,965 A * 10/1984 Brown, Jr. ............. F16D 59/02 188/72.3
4,518,061 A * 5/1985 Wehmeyer ........... B66F 11/042 187/269
4,684,314 A * 8/1987 Luth ................... B65G 41/005 187/244
4,690,606 A * 9/1987 Ross .................... B66F 7/0658 187/214
4,754,713 A * 7/1988 Chatenay epouse Compagnone ........... A63J 1/00 108/147
5,346,045 A * 9/1994 Bennett ................... G09B 9/12 74/89.37
5,398,780 A * 3/1995 Althof .................... F03G 1/024 188/185
5,476,050 A * 12/1995 Zimmer ............... B66F 11/042 254/122
5,695,173 A * 12/1997 Ochoa .................... B66F 7/065 254/9 C
5,709,523 A * 1/1998 Ware ...................... B66F 9/065 414/664
5,890,737 A * 4/1999 Hutka .................. B66F 11/042 212/196
5,988,328 A * 11/1999 Newport ................ F16D 59/02 188/186
5,992,562 A 11/1999 Boeckman et al.
6,003,927 A * 12/1999 Korber .................... B60N 2/77 296/37.8
6,234,034 B1 * 5/2001 Ando ................. F16H 25/2472 254/98
6,308,912 B1 10/2001 Kirjavainen
6,349,793 B1 * 2/2002 Kincaid ................. B66F 11/04 182/69.4
6,425,459 B1 * 7/2002 Keefer ..................... E04G 1/22 182/69.5
6,761,248 B1 * 7/2004 Harbison ............. B66F 11/042 182/69.5
8,267,222 B2 * 9/2012 Cui ...................... B66F 11/042 182/69.5
8,332,089 B2 * 12/2012 Nakazawa ............... B66F 9/20 701/22
8,919,735 B2 * 12/2014 Rosenboom .......... B66F 11/042 254/93 R
9,776,846 B2 * 10/2017 Ditty .................. B66F 9/07559
9,791,071 B2 10/2017 Ditty et al.
10,065,843 B2 * 9/2018 Ahern .................. B66F 11/042
10,093,520 B2 * 10/2018 Westergaard ........... B66C 1/108
10,166,413 B1 * 1/2019 Ragsdale ................. A62B 1/08
10,174,868 B2 1/2019 Ditty et al.
10,336,596 B2 7/2019 Puszkiewicz et al.
10,357,995 B2 7/2019 Palmer et al.
10,358,330 B2 * 7/2019 Anglade .................. B66F 3/22
10,377,288 B2 * 8/2019 Davis ..................... B62B 3/104
10,472,889 B1 11/2019 Betz
10,479,664 B2 11/2019 Linsmeier et al.
10,611,347 B1 4/2020 Archer et al.
10,617,900 B1 4/2020 Linsmeier et al.
10,676,334 B2 * 6/2020 Pithoud ................ B66F 11/042
10,894,597 B2 * 1/2021 Persico .................. B64C 25/24
12,221,147 B1 * 2/2025 Dwyer ................. B62B 3/0618
2002/0170786 A1 * 11/2002 Bucher ................. H02K 7/102 188/185
2004/0099492 A1 * 5/2004 Onuki ................. H02K 7/1023 188/163
2006/0081081 A1 4/2006 Delaney
2006/0117885 A1 * 6/2006 Robson .................... F16H 1/32 74/413
2006/0138979 A1 6/2006 Kuribayashi et al.
2006/0174614 A1 * 8/2006 Dong ..................... F16D 31/02 60/444
2007/0137970 A1 * 6/2007 Stefan .................... F16D 23/12 192/93 R
2008/0048514 A1 * 2/2008 Hoffmann ............... H02K 7/06 310/78
2008/0173852 A1 * 7/2008 Woodbury ............... B66F 5/04 254/8 B
2008/0315728 A1 * 12/2008 Liu .................... F16H 25/2454 310/80
2009/0114461 A1 * 5/2009 Clark ................... F16D 65/186 188/161
2010/0193290 A1 * 8/2010 Cui ...................... B66F 11/042 182/69.5
2011/0001102 A1 * 1/2011 Hossler ................... B66D 5/10 254/322
2011/0084245 A1 * 4/2011 Penenburgh ........... B66F 17/00 254/2 R
2011/0169268 A1 * 7/2011 Wei ...................... F03D 7/0248 188/218 XL
2012/0000729 A1 * 1/2012 Marvin .................... B66B 5/06 187/287

(56) References Cited

U.S. PATENT DOCUMENTS

2012/0000731 A1* 1/2012 Schienda .................. B66B 5/06 187/305
2012/0000732 A1* 1/2012 Draper ...................... B66B 5/06 187/373
2012/0186908 A1* 7/2012 Crook ....................... E04G 1/22 182/69.5
2012/0217458 A1* 8/2012 Rosenboom .......... B66F 11/042 74/521
2012/0226431 A1 9/2012 Mitsuhashi
2012/0240696 A1* 9/2012 Bastholm ............. A47C 20/041 74/89.38
2013/0240297 A1* 9/2013 Aquino ..................... B66B 9/00 182/113
2014/0231733 A1* 8/2014 Hoffman ............... F15B 15/261 254/93 R
2016/0090771 A1* 3/2016 Hsieh .................... E05F 15/665 49/349
2016/0372989 A1* 12/2016 Bourgoine ............. H02K 7/102
2017/0081162 A1* 3/2017 Ahern ................... B66F 11/042
2017/0219072 A1* 8/2017 Sørensen ................. H02K 7/14
2017/0253283 A1* 9/2017 Eidelson ................ B62D 61/04
2017/0283229 A1* 10/2017 Shi ........................ B66F 11/042
2017/0331350 A1* 11/2017 Sørensen ............... A61G 7/015
2017/0369283 A1* 12/2017 Hall ........................ B66B 9/022
2018/0058602 A1* 3/2018 Yates ...................... F16D 67/02
2018/0162707 A1* 6/2018 Anglade ................. B66F 9/127
2018/0162708 A1* 6/2018 Pithoud ................. B66F 17/006
2018/0201486 A1* 7/2018 Huang ..................... B66D 3/26
2019/0248203 A1* 8/2019 Krehmer ................ B60G 13/14
2019/0322512 A1 10/2019 Puszkiewicz et al.
2019/0359460 A1 11/2019 Linsmeier et al.
2020/0071996 A1 3/2020 Betz
2020/0140248 A1 5/2020 Hackenberg et al.
2020/0140249 A1 5/2020 Hackenberg et al.
2020/0155091 A1* 5/2020 Dirisio .................... F16D 59/02
2020/0268460 A1* 8/2020 Tse ....................... A61G 13/104
2020/0284329 A1* 9/2020 Soltermann ........... B66F 7/0666
2020/0309215 A1* 10/2020 Usui ....................... F16D 65/09
2021/0091632 A1* 3/2021 Hofmann ................. H02K 7/10
2021/0138888 A1* 5/2021 Hennessy .............. H02N 2/181
2021/0284512 A1* 9/2021 Peterson ............... B66F 17/006
2022/0213734 A1* 7/2022 Tooley .................. B66F 11/042
2022/0221035 A1* 7/2022 Schewe ............... F16H 25/2454
2023/0157912 A1* 5/2023 Thota ..................... A61G 7/015 5/616

FOREIGN PATENT DOCUMENTS

| | | | | |
|---|---|---|---|---|
| CN | 203294980 | U | 11/2013 | |
| CN | 105668388 | A | 6/2016 | |
| CN | 107906063 | A | 4/2018 | |
| CN | 207408098 | U | 5/2018 | |
| DE | 27 48 063 | A1 | 5/1978 | |
| EP | 0 551 197 | A1 | 7/1993 | |
| EP | 0 786 432 | A2 | 7/1997 | |
| EP | 1 710 202 | A2 | 10/2006 | |
| GB | 0 610 765 | A | 10/1948 | |
| GB | 1 075 715 | A | 7/1967 | |
| GB | 1 591 065 | A | 6/1981 | |
| JP | 2015-044654 | A | 3/2015 | |
| JP | 5877811 | B2 | 3/2016 | |
| KR | 20000028374 | A | 5/2000 | |
| WO | WO-2013035506 | A1 * | 3/2013 | F16D 41/066 |

OTHER PUBLICATIONS

Office Action issued in Chinese Appl. No. 202311628384.7 dated Mar. 24, 2026.

* cited by examiner 10
20
12
25
25

48
38
46
30
36
50
34
45
42
32
74
45

48
38
40

SCISSOR LIFT DESCENT CONTROL SYSTEMS AND METHODS

CROSS-REFERENCE TO RELATED APPLICATION

This application is a continuation of U.S. patent application Ser. No. 16/811,851, filed on Mar. 6, 2020, which claims the benefit of U.S. Provisional Application No. 62/830,164, filed Apr. 5, 2019, each of which is incorporated herein by reference in its entirety.

BACKGROUND

Lift devices commonly include a vertically movable platform that is supported by a foldable series of linked supports. The linked supports are arranged in an "X" pattern, crisscrossing with one another. A hydraulic cylinder generally controls vertical movement of the platform by engaging and rotating (i.e., unfolding) the lowermost set of linked supports, which in turn unfolds the remainder of the series of linked supports within the system. The platform raises and lowers based upon the degree of actuation by the hydraulic cylinder. A hydraulic cylinder may also control various other vehicle actions, such as, for example, steering or platform tilt functions. Lift devices using one or more hydraulic cylinders require an on-board reservoir tank to store hydraulic fluid for the lifting process.

SUMMARY

One exemplary embodiment relates to a lift device. The lift device comprises a base, a retractable lift mechanism, a work platform, a linear actuator, and an electromagnetic brake. The base has a plurality of wheels. The retractable lift mechanism has a first end coupled to the base and is moveable between an extended position and a retracted position. The work platform is configured to support a load. The work platform is coupled to and supported by a second end of the retractable lift mechanism. The linear actuator is configured to selectively move the retractable lift mechanism between the extended position and the retracted position. The linear actuator has an electric motor. The electromagnetic brake is coupled to the linear actuator and movable between an engaged position, in which the retractable lift mechanism is prevented from moving between the extended position and the retracted position, and a disengaged position, in which the retractable lift mechanism is allowed to move between the extended position and the retracted position. In the event of a power failure, the electromagnetic brake is biased toward the engaged position.

Another exemplary embodiment relates to a lift device. The lift device comprises a base, a retractable lift mechanism, a work platform, a linear actuator, and a descent control mechanism. The base has a plurality of wheels. The retractable lift mechanism has a first end coupled to the base and is moveable between an extended position and a retracted position. The work platform is configured to support a load. The work platform is coupled to and supported by a second end of the retractable lift mechanism. The linear actuator is configured to selectively move the retractable lift mechanism between the extended position and the retracted position. The linear actuator has an electric motor. The descent control mechanism is configured to reduce a speed at which the retractable lift mechanism is moved from the extended position to the retracted position.

Another exemplary embodiment relates to a lift device. The lift device comprises a base, a retractable lift mechanism, a work platform, a linear actuator, an electromagnetic brake, a manual release device, and a descent control mechanism. The base has a plurality of wheels. The retractable lift mechanism has a first end coupled to the base and is moveable between an extended position and a retracted position. The work platform is configured to support a load. The work platform is coupled to and supported by a second end of the retractable lift mechanism. The linear actuator is configured to selectively move the retractable lift mechanism between the extended position and the retracted position. The linear actuator has an electric motor. The electromagnetic brake is coupled to the linear actuator and movable between an engaged position, in which the retractable lift mechanism is prevented from moving between the extended position and the retracted position, and a disengaged position, in which the retractable lift mechanism is allowed to move between the extended position and the retracted position, the electromagnetic brake being biased toward the engaged position in the event of a power failure. The manual release device is configured to manually move the electromagnetic brake from the engaged position to the disengaged position. The descent control mechanism is configured to reduce a speed at which the retractable lift mechanism is moved from the extended position to the retracted position.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the figures generally, the various exemplary embodiments disclosed herein relate to systems, apparatuses, and methods for the controlled descent of a work platform on a lift device. The lift device includes an electromagnetic brake that is configured to engage in the event of a power failure (e.g., a battery discharge or a control system failure) to hold the work platform in place (i.e., at a constant height). The lift device further includes a manual release mechanism to selectively release the electromagnetic brake to lower the work platform in the event of a battery discharge or a control system failure. The lift device further includes a descent limiting mechanism that limits the speed at which the work platform is allowed to lower when the electromagnetic brake is disengaged. Thus, the lift device allows for the work platform and any worker on the work platform to be safely lowered from a deployed work position in the event of a battery discharge or a control system failure.

Figure 1A:
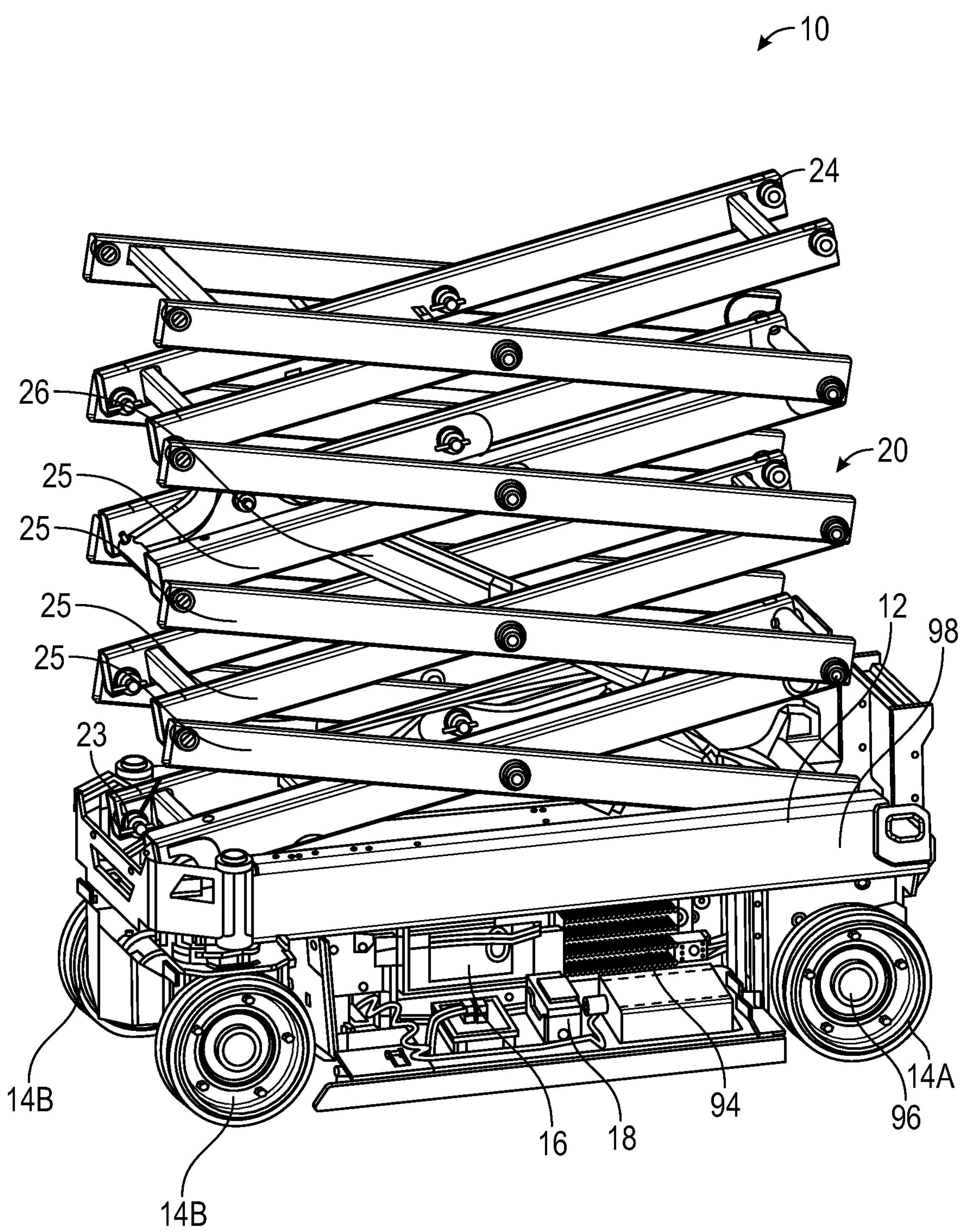
FIG. 1A is a side perspective view of a lift device in the form of a scissor lift, according to an exemplary embodiment.
Figure 1B:
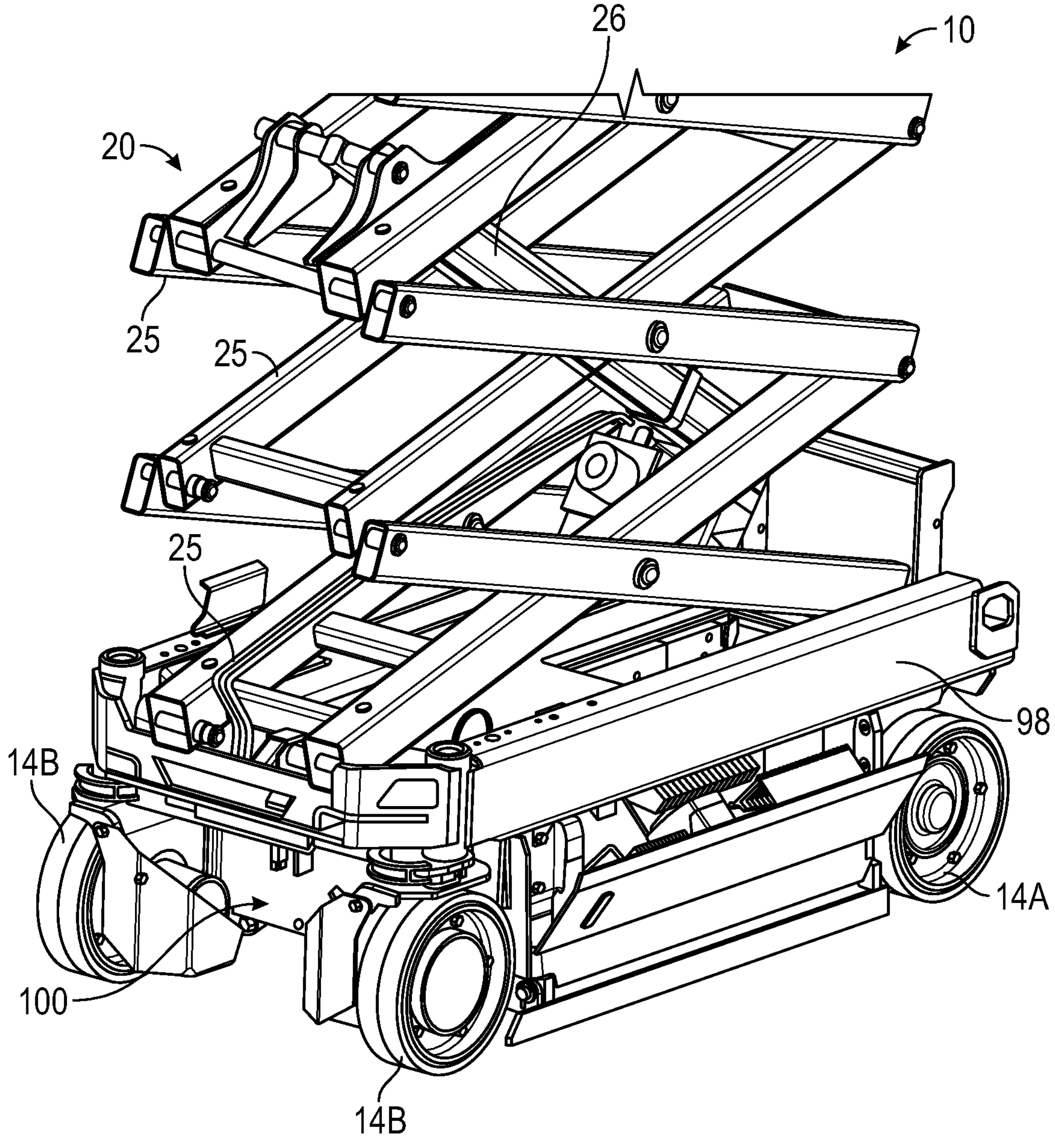
FIG. 1B is another side perspective view of the lift device of FIG. 1A.

According to the exemplary embodiment depicted in FIGS. 1A and 1B, a vehicle, shown as vehicle 10, is illustrated. The vehicle 10 may be a scissor lift, for example, which can be used to perform a variety of different tasks at various elevations. The vehicle 10 includes a base 12 supported by wheels 14A, 14B positioned about the base 12. The vehicle 10 further includes a battery 16 positioned on board the base 12 of the vehicle 10 to supply electrical power to various operating systems present on the vehicle 10.

The battery 16 can be a rechargeable lithium-ion battery, for example, which is capable of supplying a direct current (DC) or alternating current (AC) to controls, motors, actuators, and the like included on board the vehicle 10. The battery 16 can include at least one input 18 capable of receiving electrical current to recharge the battery 16. In some embodiments, the input 18 is a port capable of receiving a plug in electrical communication with an external power source, like a wall outlet. The battery 16 can be configured to receive and store electrical current from one of a traditional 120 V outlet, a 240 V outlet, a 480 V outlet, an electrical power generator, or another suitable electrical power source.

Figure 2A:
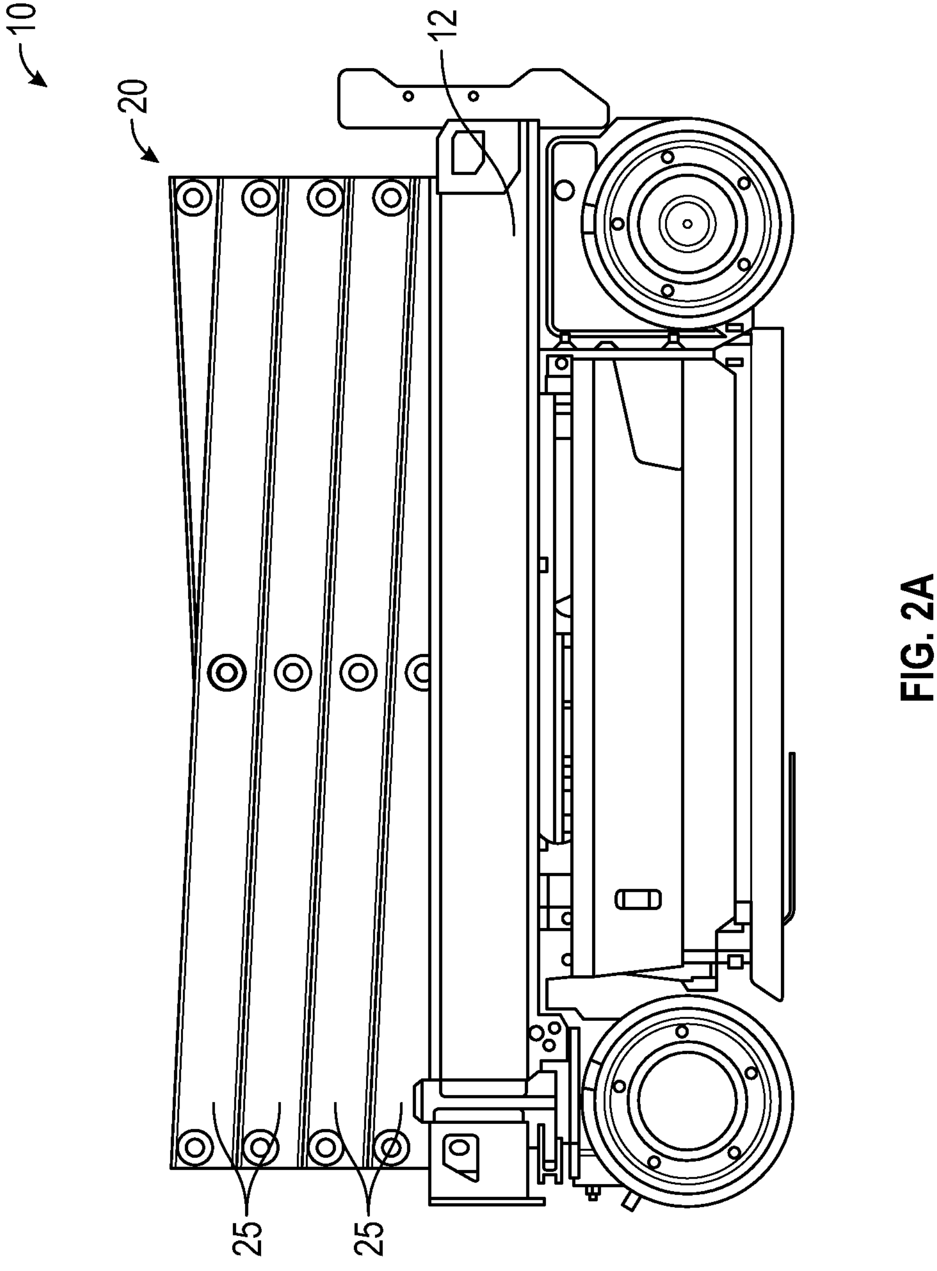
FIG. 2A is a side view of the lift device of FIG. 1A, shown in a retracted or stowed position.

The vehicle 10 further includes a retractable lift mechanism, shown as a scissor lift mechanism 20, coupled to the base 12. The scissor lift mechanism 20 supports a work platform 22 (shown in FIG. 3). As depicted, a first end 23 of the scissor lift mechanism 20 is anchored to the base 12, while a second end 24 of the scissor lift mechanism 20 supports the work platform 22. As illustrated, the scissor lift mechanism 20 is formed of a foldable series of linked support members 25. The scissor lift mechanism 20 is selectively movable between a retracted or stowed position (shown in FIG. 2A) and an extended, deployed, or work position (shown in FIG. 2B) using an actuator, shown as linear actuator 26. The linear actuator 26 is an electric actuator. The linear actuator 26 controls the orientation of the scissor lift mechanism 20 by selectively applying force to the scissor lift mechanism 20. When a sufficient force is applied to the scissor lift mechanism 20 by the linear actuator 26, the scissor lift mechanism 20 unfolds or otherwise deploys from the stowed or retracted position into the work position. Because the work platform 22 is coupled to the scissor lift mechanism 20, the work platform 22 is also raised away from the base 12 in response to the deployment of the scissor lift mechanism 20.

Figure 3:
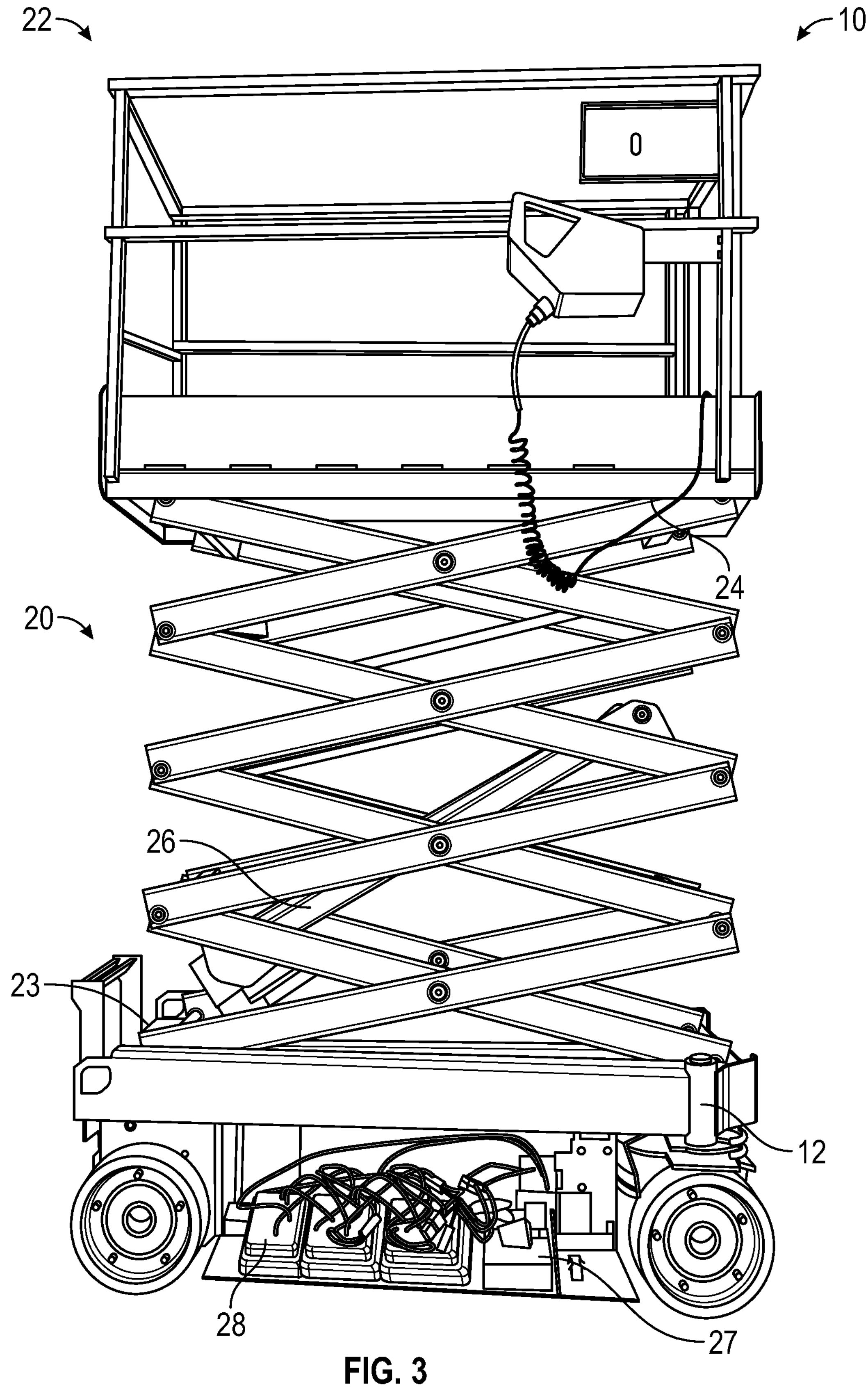
FIG. 3 is a side view of the lift device of FIG. 1A, depicting various vehicle controllers.

As shown in FIG. 3, the vehicle 10 further includes a vehicle controller 27 and a lift motor controller 28. The vehicle controller 27 is in communication with the lift motor controller 28 and is configured to control various driving systems on the vehicle 10. The lift motor controller 28 is in communication with the linear actuator 26 and is configured to control the movement of the scissor lift mechanism 20. Communication between the lift motor controller 28 and the linear actuator 26 and/or between the vehicle controller 27 and the lift motor controller 28 can be provided through a hardwired connection or through a wireless connection (e.g., Bluetooth, Internet, cloud-based communication system, etc.). It should be understood that each of the vehicle controller 27 and the lift controller 28 includes various processing and memory components configured to perform the various activities and methods described herein. For example, in some instances, each of the vehicle controller 27 and the lift controller 28 includes a processing circuit having a processor and a memory. The memory is configured to store various instructions configured to, when executed by the processor, cause the vehicle 10 to perform the various activities and methods described herein.

Figure 2B:
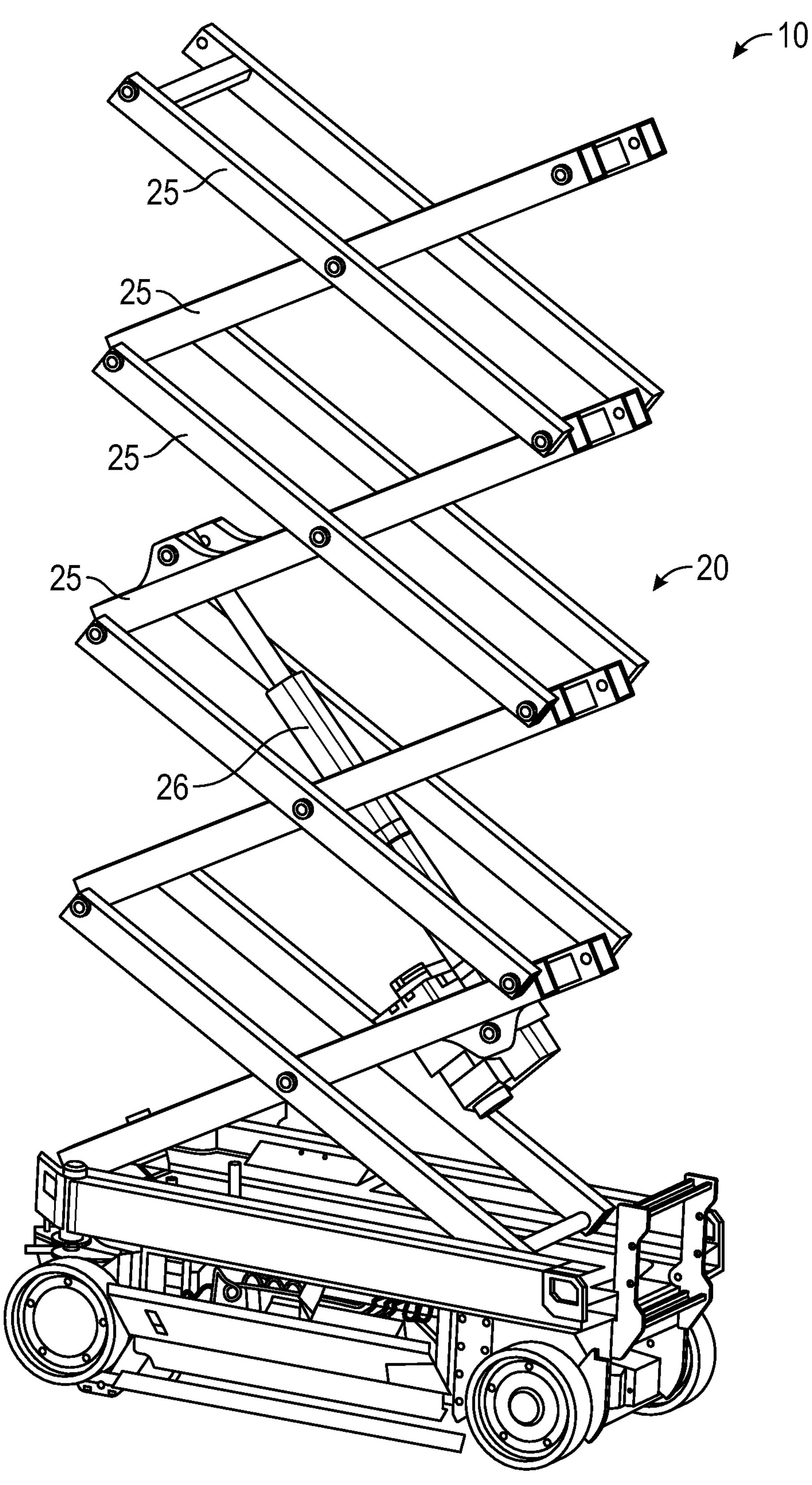
FIG. 2B is a side perspective view of the lift device of FIG. 1A, shown in an extended or work position.
Figure 4:
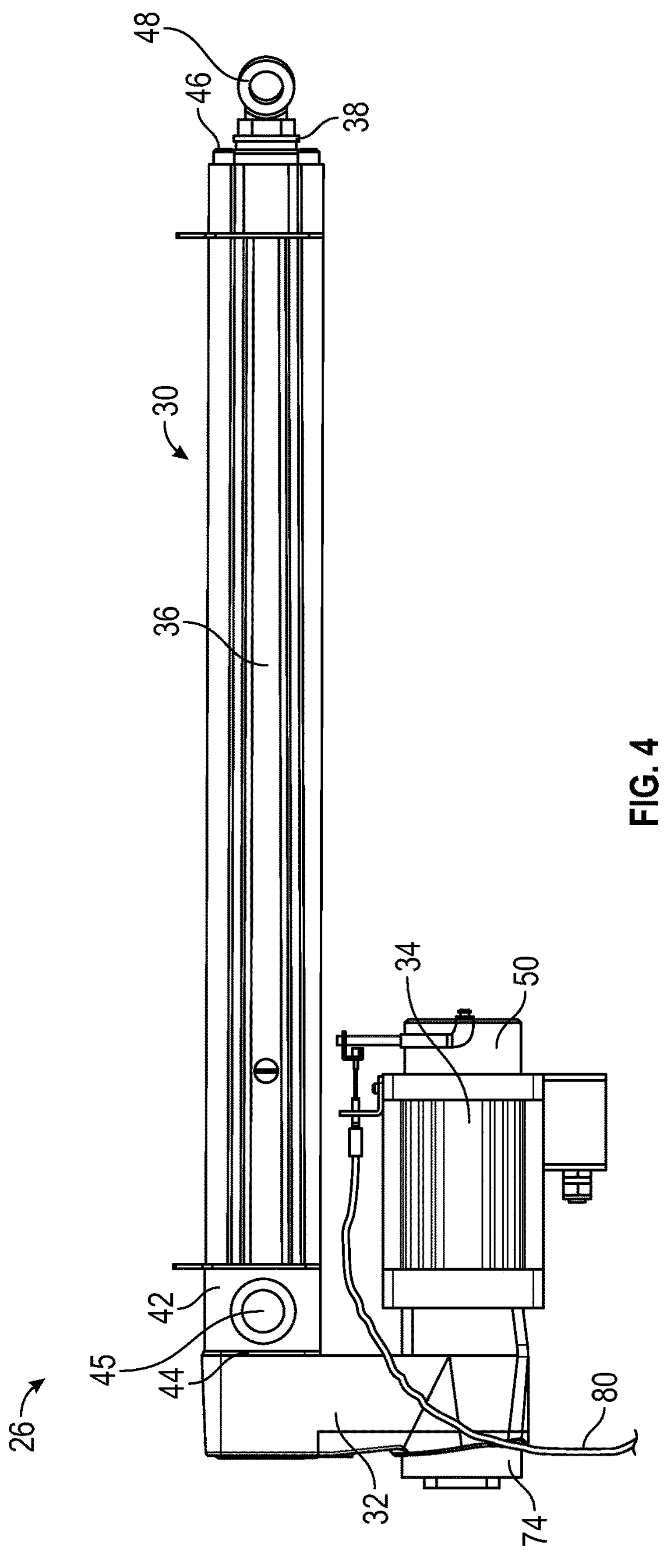
FIG. 4 is a side view of a linear actuator of the lift device of FIG. 1A.
Figures 5, 6:
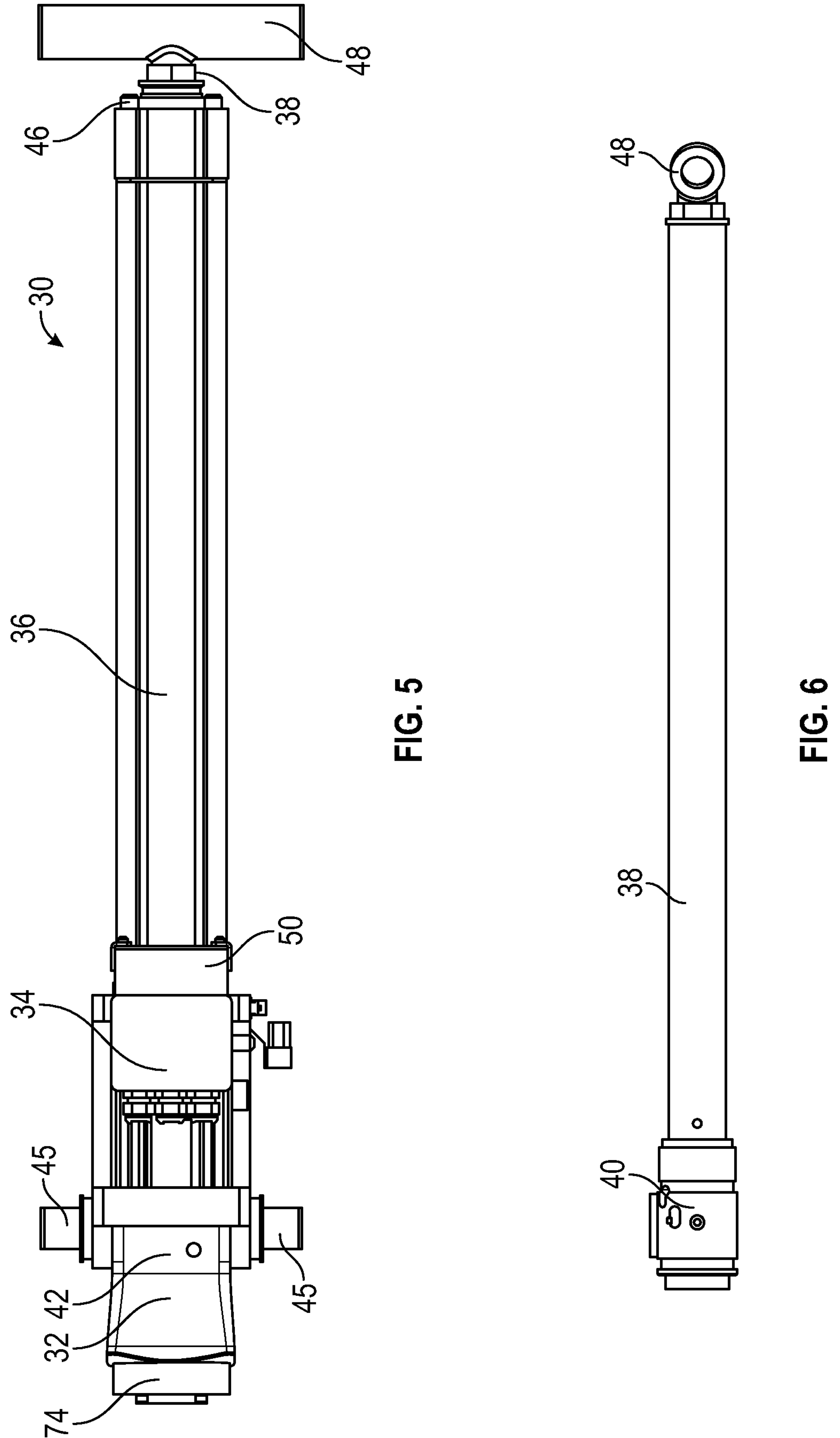
FIG. 5 is a bottom view of the linear actuator of FIG. 4.
FIG. 6 is a side view of a push tube and a nut assembly of the linear actuator of FIG. 4.

As illustrated in the exemplary embodiment provided in FIGS. 4-6, the linear actuator 26 includes a push tube assembly 30, a gear box 32, and an electric lift motor 34. The push tube assembly 30 includes a protective outer tube 36 (shown in FIGS. 4 and 5), a push tube 38, and a nut assembly 40 (shown in FIG. 6). The protective outer tube 36 has a trunnion connection portion 42 disposed at a proximal end 44 thereof. The trunnion connection portion 42 is rigidly coupled to the gear box 32, thereby rigidly coupling the protective outer tube 36 to the gear box 32. The trunnion connection portion 42 further includes a trunnion mount 45 that is configured to rotatably couple the protective outer tube 36 to one of the support members 25 (as shown in FIG. 2B).

The protective outer tube 36 further includes an opening at a distal end 46 thereof. The opening of the protective outer tube 36 is configured to slidably receive the push tube 38. The push tube 38 includes a connection end, shown as trunnion mount 48, configured to rotatably couple the push tube 38 to another one of the support members 25 (as shown in FIG. 2B). As will be discussed below, the push tube 38 is slidably movable and selectively actuatable between an extended position (shown in FIG. 2B) and a retracted position (shown in FIG. 4).

Referring now to FIG. 6, the push tube 38 is rigidly coupled to the nut assembly 40, such that motion of the nut assembly 40 results in motion of the push tube 38. The push tube 38 and the nut assembly 40 envelop a central screw rod. The central screw rod is rotatably engaged with the gear box 32 and is configured to rotate within the push tube 38 and the nut assembly 40, about a central axis of the push tube assembly 30. The nut assembly 40 is configured to engage the central screw rod and translate the rotational motion of the central screw rod into translational motion of the push tube 38 and the nut assembly 40, with respect to the central screw rod, along the central axis of the push tube assembly 30. In some embodiments, the nut assembly 40 may be, for example, a ball screw assembly or a roller screw assembly. In some other embodiments, the nut assembly 40 may be any other suitable assembly for translating rotational motion of the central screw rod into translational motion of the push tube 38 and the nut assembly 40.

Referring again to FIG. 4, the lift motor 34 is configured to selectively provide rotational actuation to the gear box 32. The rotational actuation from the lift motor 34 is then translated through the gear box 32 to selectively rotate the central screw rod of the push tube assembly 30. The rotation of the central screw rod is then translated by the nut assembly 40 to selectively translate the push tube 38 and the nut assembly 40 along the central axis of the push tube assembly 30. Accordingly, the lift motor 34 is configured to selectively actuate the push tube 38 between the extended position and the retracted position. Thus, with the trunnion mount 45 of the protective outer tube 36 and the trunnion mount 48 of the push tube 38 each rotatably coupled to their respective support members 25, the lift motor 34 is configured to selectively move the scissor lift mechanism 20 to various heights between and including the retracted or stowed position and the deployed or work position.

The lift motor 34 may be an AC motor (e.g., synchronous, asynchronous, etc.) or a DC motor (shunt, permanent magnet, series, etc.). In some instances, the lift motor 34 is in communication with and powered by the battery 16. In some other instances, the lift motor 34 may receive electrical power from another electricity source on board the vehicle 10.

Figure 7B:
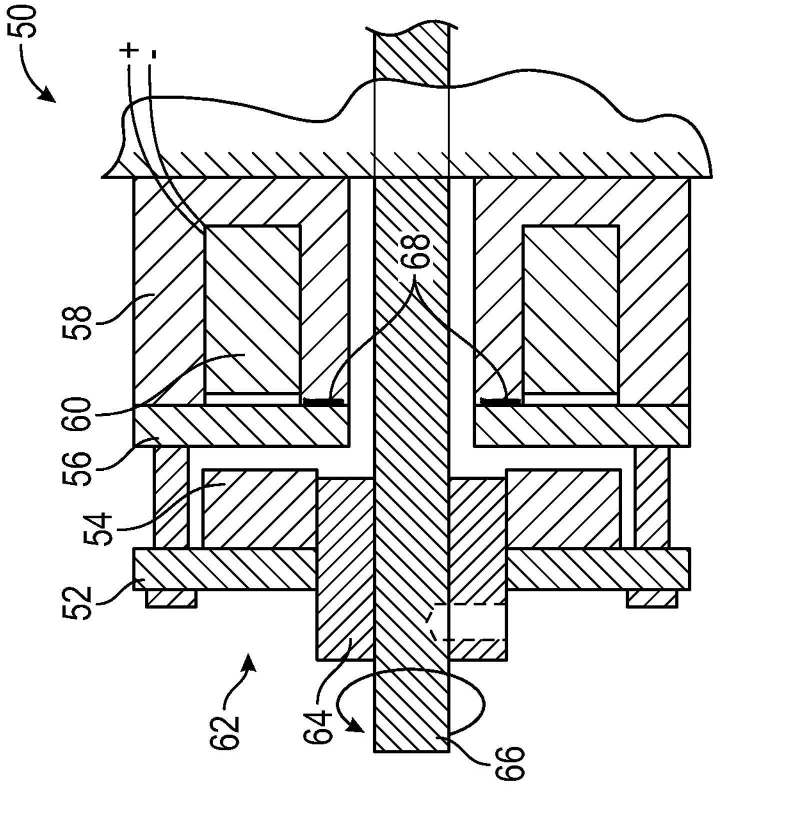
FIG. 7B is a cross-sectional view of the electromagnetic brake of FIG. 7A, shown in a disengaged position.
Figure 7A:
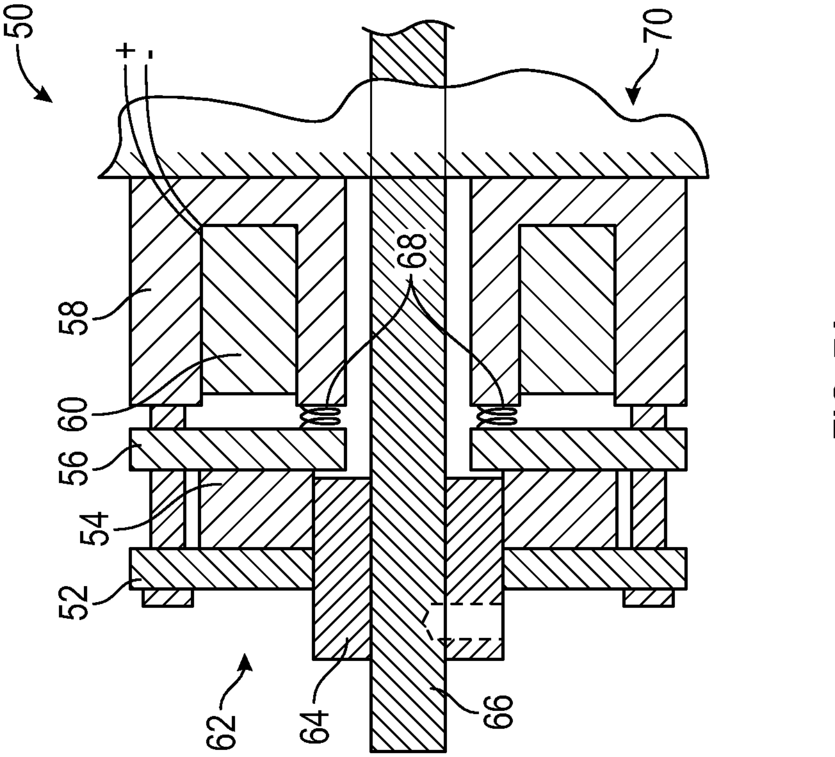
FIG. 7A is a cross-sectional view of an electromagnetic brake of the linear actuator of FIG. 4, shown in an engaged position.
Figure 8:
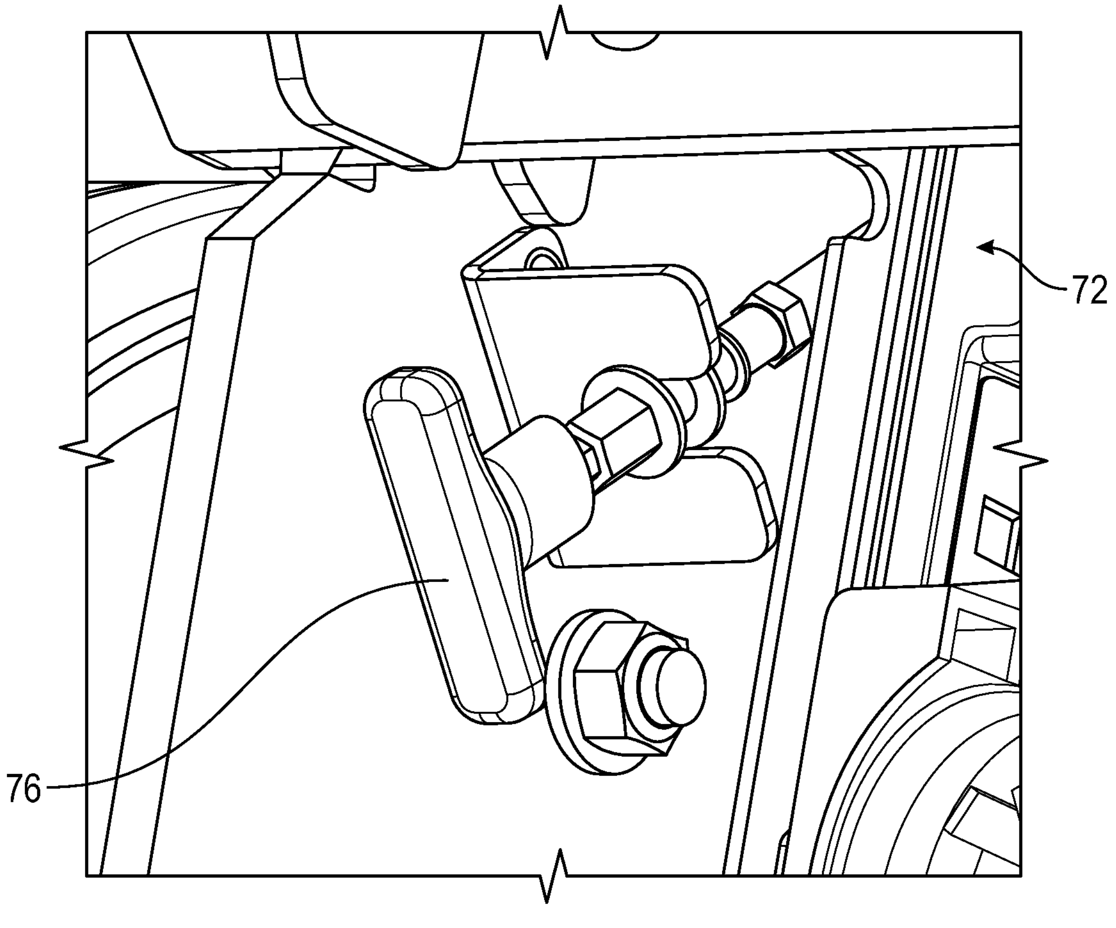
FIG. 8 is a perspective view of a manual pull handle of a manual pull device of the lift device of FIG. 1A.

As depicted in the exemplary embodiment shown in FIGS. 7A and 7B, the lift motor 34 includes an electromagnetic brake 50 configured to hold the work platform 22 in place (i.e., at a constant height) in the case of a battery discharge or a control system failure. As illustrated in FIGS. 7A and 7B, the electromagnetic brake 50 includes a pressure plate 52, a friction disk 54, an armature 56, a magnetic body 58, and a wire coil 60. As illustrated, the pressure plate 52 is disposed at a first end 62 of the electromagnetic brake 50. The pressure plate 52 surrounds a hub 64. The hub 64 is fixed to a rotor 66 of the lift motor 34, such that the hub 64 and the rotor 66 are rotationally coupled (e.g., rotation of one of the hub 64 and the rotor 66 results in the rotation of the other of the hub 64 and the rotor 66). The friction disk 54 is disposed adjacent the pressure plate 52. The friction disk 54 is fixed to the hub 64, such that of the hub 64, the rotor 66, and the friction disk 54 are all rotationally coupled (e.g., rotation of one of the hub 64, the rotor 66, and the friction disk 54 results in the rotation of the other two of the hub 64, the rotor 66, and the friction disk 54). The armature 56 is disposed adjacent the friction disk 54, and is biased into contact with the friction disk 54 by engagement springs 68.

The magnetic body 58 and the wire coil 60 are disposed at a second end 70 of the electromagnetic brake 50. The magnetic body 58 and the wire coil 60 are configured to selectively produce a magnetic force on the armature 56 to pull the armature 56 toward the magnetic body 58.

Referring now to FIG. 7A, the electromagnetic brake 50 is shown in an engaged position. Specifically, when there is no power applied to the wire coil 60 of the lift motor 34, the magnetic body 58 and the wire coil 60 do not produce any magnetic force on the armature 56. As such, the engagement springs 68 bias the armature 56 against the friction disk 54, thereby preventing rotation of the friction disk 54. Because the friction disk 54 is fixed to the hub 64, and the hub is rigidly coupled to the rotor 66, the rotor 66 is also prevented from rotating, thereby preventing the work platform 22 from moving vertically (e.g., because the central screw rod is prevented from spinning, such that the linear actuator is prevented from translating). Accordingly, when no power is applied to the wire coil 60 of the lift motor 34, the electromagnetic brake 50 is biased toward the engaged position.

Referring now to FIG. 7B, the electromagnetic brake 50 is shown in a disengaged position. Specifically, when power (e.g., a current) is applied to the wire coil 60 of the lift motor 34, the magnetic body 58 and the wire coil 60 produce an electromagnetic force on the armature 56, compressing the engagement springs 68 and pulling the armature 56 out of contact with the friction disk 54. Accordingly, the friction disk 54, the hub 64, and the rotor 66 are all free to rotate. As such, the lift motor 34 is allowed to function normally.

During normal operation, when the lift motor 34 is commanded to lift or lower the work platform 22, power is also applied to the wire coil 60 to allow for the lift motor 34 to function as intended. Then, when the lift motor 34 is not being commanded to lift or lower the work platform 22, power is not applied to the wire coil 60, such that the friction disk 54 is engaged by the armature 56, and the work platform 22 is prevented from moving vertically.

As such, in the event of a power failure (e.g., the battery 16 is discharged or the control system fails), when power is cut from the wire coil 60, the electromagnetic brake 50 is configured to automatically return to the engaged position, and the scissor lift mechanism 20 is prevented from moving between the extended position and the retracted position. In some embodiments, if the battery 16 is discharged or the control system fails when the scissor lift mechanism 20 is in the extended position (i.e., the work platform 22 is in a raised position) it may be desired to allow for the work platform 22 (and any users working on the work platform 22) to be safely lowered from the raised or deployed position back down to the stowed or lowered position.

Accordingly, as illustrated in the exemplary embodiment shown in FIGS. 8-12, the vehicle 10 further includes a manual release device 72 and a descent limiting mechanism, shown as centrifugal brake 74. The manual release device 72 is configured to manually move the electromagnetic brake 50 into the disengaged position, such that the work platform 22 can be lowered due to gravity. The centrifugal brake 74 is configured to provide resistance to and modulate (e.g., mechanically reduce) the speed at which the work platform 22 is lowered.

Figure 9:
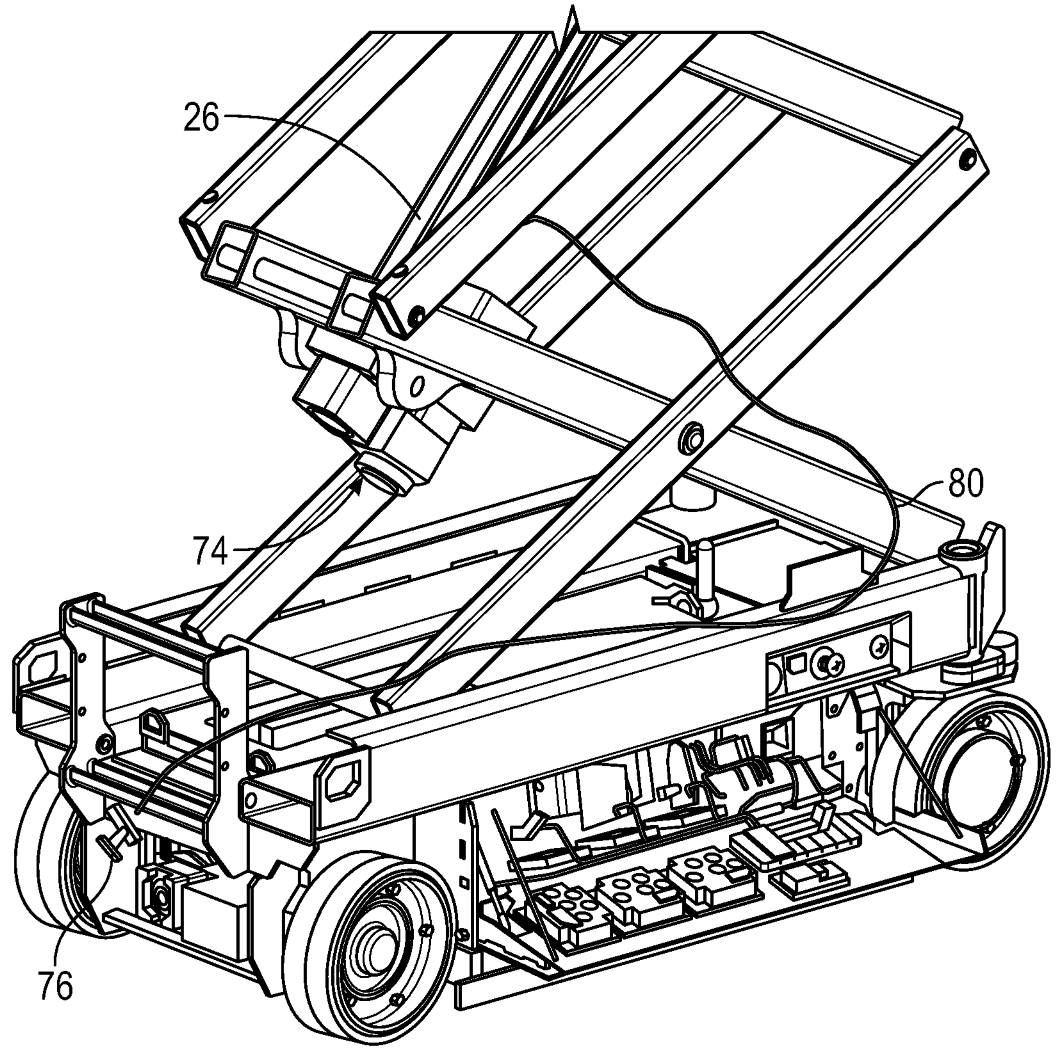
FIG. 9 is a side perspective view of the lift device of FIG. 1A, showing the manual pull device.
Figure 10:
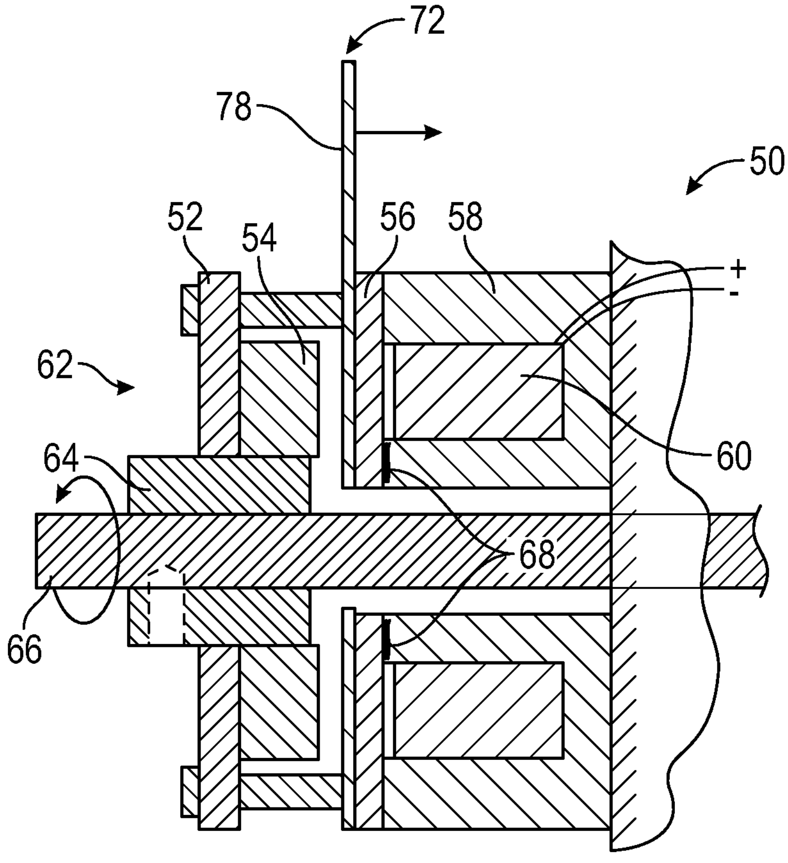
FIG. 10 is a cross-sectional view of the electromagnetic brake of FIG. 7A, shown including a release tab.
Figure 11:
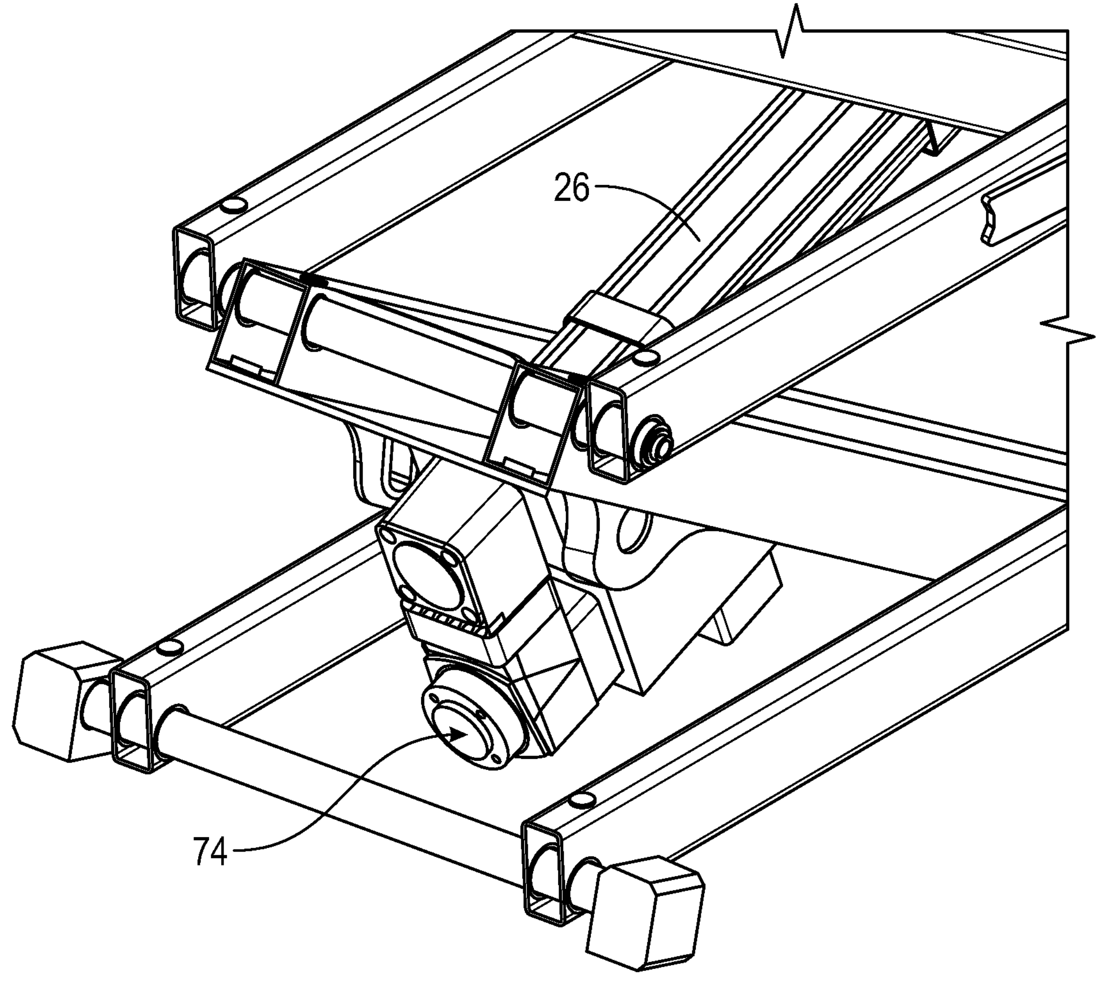
FIG. 11 is a perspective view of the linear actuator of FIG. 4, showing a centrifugal brake.

Specifically, the manual release device 72 includes a manual pull handle 76 (shown in FIGS. 8 and 9) that is connected to a release tab 78 (shown in FIG. 10) through a Bowden cable 80 (shown in FIG. 9). As the manual pull handle 76 is pulled, the Bowden cable 80 pulls on the release tab 78, which is fixed to the armature 56. Accordingly, the armature 56 is moved out of contact with the friction disk 54, thereby manually moving the electromagnetic brake 50 into the disengaged position and allowing the work platform 22 to lower.

Figure 12:
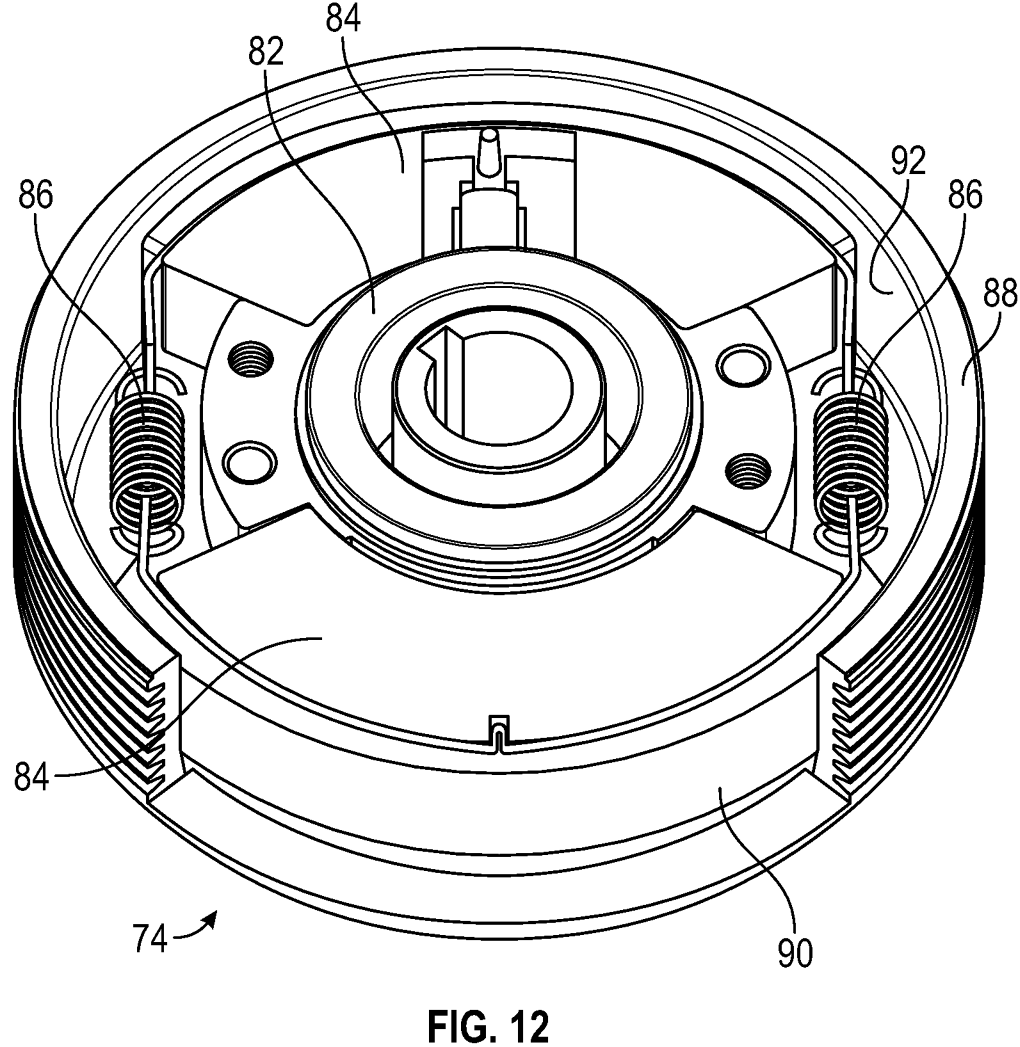
FIG. 12 is a perspective view of the centrifugal brake of FIG. 11, showing the internal components of the centrifugal brake.

The centrifugal brake 74 is configured to modulate (e.g., mechanically reduce) the speed at which the rotor 66 is allowed to rotate. Specifically, the centrifugal brake 74 prevents the work platform 22 from descending too rapidly when the electromagnetic brake 50 is disengaged. Specifically, as best shown in FIG. 12, the centrifugal brake 74 includes a rotor connection portion 82, a pair of weights 84, a pair of retention springs 86, and a casing 88. The rotor connection portion 82 is rotationally fixed to the rotor 66

(e.g., through a keyway connection, a set screw, or any other suitable connection). The pair of weights 84 are disposed on opposite sides of the rotor connection portion 82. The pair of weights 84 are configured to engage the rotor connection portion 82, such that rotation of the rotor connection portion 82 results in rotation of the pair of weights 84, and vice versa. Each weight 84 of the pair of weights 84 includes a frictional outer surface 90. The pair of retention springs 86 are configured to maintain an inwardly-biased force on the pair of weights 84, generally directed toward the rotor 66.

During operation, as the rotor 66 rotates, the pair of weights 84 tend to move radially outward, away from the rotor 66. The pair of retention springs 86 are configured to provide a radially-inward (i.e., toward the rotor 66) force onto the weights 84, preventing the frictional outer surface 90 of the weights 84 from contacting a frictional inner surface 92 of the casing 88, and thus from reducing the rotational speed of the rotor 66, until the rotor 66 exceeds a predetermined rotational speed. That is, in some embodiments, the centrifugal brake 74 is configured to reduce the rotational speed of the rotor 66 once the rotational speed of the rotor 66 reaches or exceeds the predetermined rotational speed.

In some embodiments, the predetermined rotational speed may be approximately 2050 rpm. In some other embodiments, the predetermined rotational speed may be between 1850 rpm and 2250 rpm. In yet some other embodiments, the predetermined rotational speed may be more than 2250 rpm or less than 1850 rpm, as desired for a given application. Once the rotor 66 exceeds the predetermined rotational speed, the required centripetal force needed to retain the weights adjacent the rotor connection portion 82 exceeds the spring force, allowing the weights to move radially outward. As such, the frictional outer surface 90 of the weights 84 contacts the frictional inner surface 92 of the casing 88, which effectively limits the rotational speed of the rotor 66.

As such, during operation, in the event that the battery 16 is discharged or the control system fails, the manual release device 72 and the centrifugal brake 74 allow for the work platform 22 to be safely lowered from the deployed position. Further, in the event that the manual pull handle 76 is pulled during normal operation, the lift motor controller 28 may be configured to control the descent of the work platform 22 using the lift motor 34.

Although the illustrated centrifugal brake 74 is shown opposite the gear box 32 from the lift motor 34, in some embodiments, the centrifugal brake 74 may alternatively be located between the gear box 32 and the lift motor 34. In some other embodiments, the centrifugal brake 74 may be alternatively located opposite the electromagnetic brake 50 from the lift motor 34.

Further, in some embodiments, the descent limiting mechanism may be replaced by various other types of brake mechanisms that are configured to limit the rotational speed of the rotor 66. For example, in some embodiments, the linear actuator 26 may alternatively or additionally include a shoe brake, a drum brake, a disk brake, or any other suitable brake mechanism, as desired for a given application.

Additionally, in some embodiments, in addition to or in place of the centrifugal brake 74, the linear actuator 26 may include a descent limiting mechanism in the form of a permanent magnet motor. The permanent magnet motor has terminals that are biased toward a shunted position, but are actively held open during normal operation. As such, in the event of the battery 16 being discharged or the control system failing, the terminals are shunted together, such that the permanent magnet motor acts like a generator. With the permanent magnet motor acting like a generator, the speed at which the rotor 66 is allowed to rotate would be effectively reduced.

In some embodiments, the lift motor 34 may be a permanent magnet motor, and may be configured to both selectively actuate the linear actuator 26, while also having terminals that are biased toward a shunted position in the case of the battery 16 being discharged or the control system failing, such that the lift motor 34 acts as a generator and reduces the speed of the rotor 66 in the case of a battery discharge or a control system failure.

Referring again to FIGS. 1A and 1B, the battery 16 can also be in communication with the vehicle controller 27, which can command the battery 16 to selectively supply electrical power to a drive motor 94 to propel the vehicle 10. The drive motor 94 may similarly be an AC motor (e.g., synchronous, asynchronous, etc.) or a DC motor (shunt, permanent magnet, series, etc.) for example, which receives electrical power from the battery 16 or other electricity source on board the vehicle 10 and converts the electrical power into rotational energy in a drive shaft. The drive shaft can be used to drive the wheels 14A, 14B of the vehicle 10 using a transmission. The transmission can receive torque from the drive shaft and subsequently transmit the received torque to a rear axle 96 of the vehicle 10. Rotating the rear axle 96 also rotates the rear wheels 14A on the vehicle 10, which propels the vehicle 10.

The rear wheels 14A of the vehicle 10 can be used to drive the vehicle, while the front wheels 14B can be used to steer the vehicle 10. In some embodiments, the rear wheels 14A are rigidly coupled to the rear axle 96, and are held in a constant orientation relative to the base 12 of the vehicle 10 (e.g., approximately aligned with an outer perimeter 98 of the vehicle 10). In contrast, the front wheels 14B are pivotally coupled to the base 12 of the vehicle 10. The wheels 14B can be rotated relative to the base 12 to adjust a direction of travel for the vehicle 10. Specifically, the front wheels 14B can be oriented using an electrical steering system 100. In some embodiments, the steering system 100 may be completely electrical in nature, and may not include any form of hydraulics.

Figure 13:
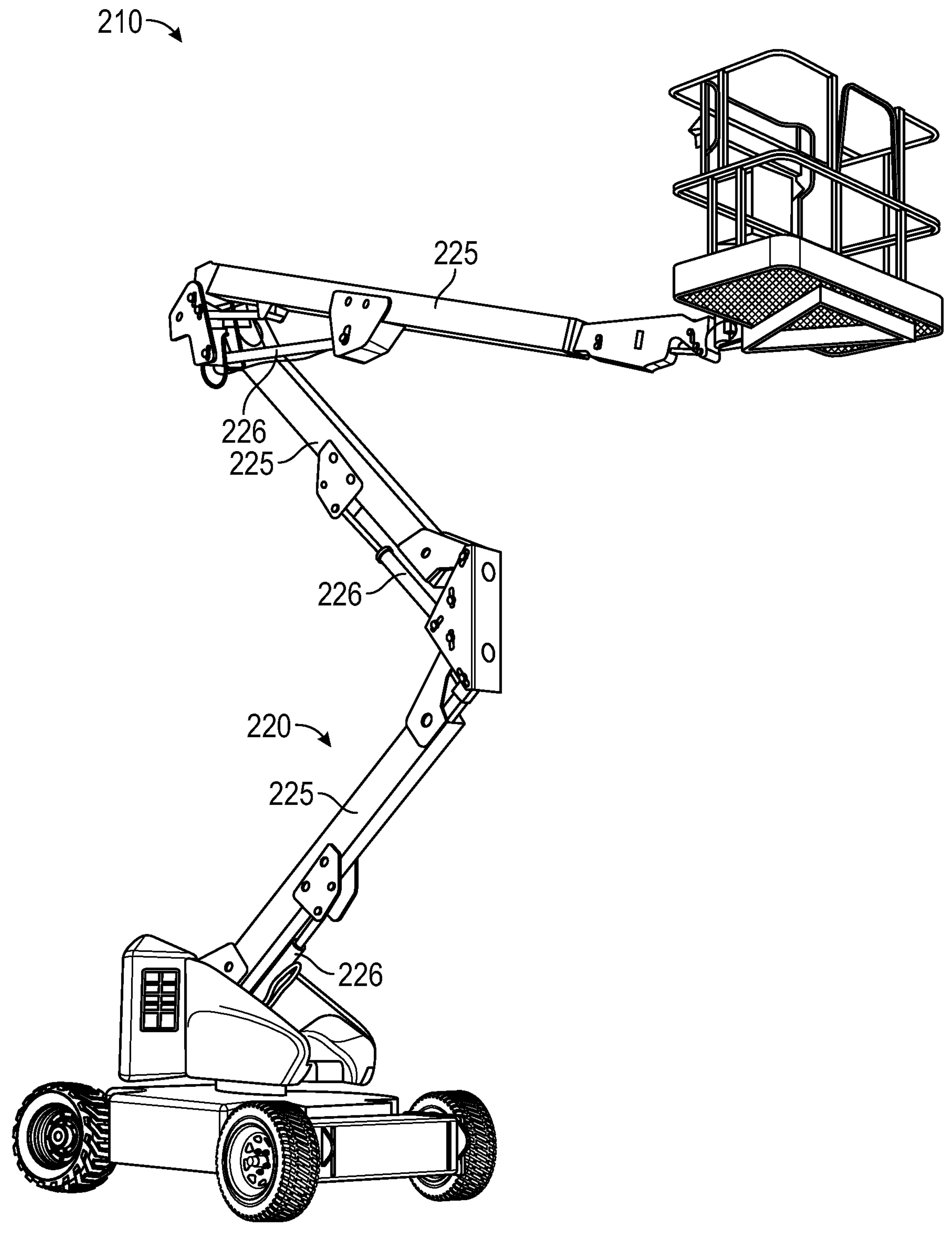
FIG. 13 is a side perspective view of another lift device in the form of a boom lift, according to another exemplary embodiment.

It should be appreciated that, while the retractable lift mechanism included on vehicle 10 is a scissor lift mechanism, in some instances, a vehicle may be provided that alternatively includes a retractable lift mechanism in the form of a boom lift mechanism. For example, in the exemplary embodiment depicted in FIG. 13, a vehicle, shown as vehicle 210, is illustrated. The vehicle 210 includes a retractable lift mechanism, shown as boom lift mechanism 220. The boom lift mechanism 220 is similarly formed of a foldable series of linked support members 225. The boom lift mechanism 220 is selectively movable between a retracted or stowed position and a deployed or work position using a plurality of actuators 226. Each of the plurality of actuators 226 is a linear actuator similar to the linear actuator 26.

It should be further appreciated that the linear actuators used in the lift mechanism 20, 220, as well as in the steering system 100, may be incorporated into nearly any type of electric vehicle. For example, the electric systems described herein can be incorporated into, for example, a scissor lift, an articulated boom, a telescopic boom, or any other type of aerial work platform.

Advantageously, vehicles 10, 210 may be fully-electric lift devices. All of the electric actuators and electric motors of vehicles 10, 210 can be configured to perform their respective operations without requiring any hydraulic systems, hydraulic reservoir tanks, hydraulic fluids, engine systems, etc. That is, both vehicles 10, 210 may be completely devoid of any hydraulic systems and/or hydraulic fluids generally. Said differently, both vehicles 10, 210 may be devoid of any moving fluids. Traditional lift device vehicles do not use a fully-electric system and require regular maintenance to ensure that the various hydraulic systems are operating properly. As such, the vehicles 10, 210 may use electric motors and electric actuators, which allows for the absence of combustible fuels (e.g., gasoline, diesel) and/or hydraulic fluids. As such, the vehicles 10, 210 may be powered by batteries, such as battery 16, that can be recharged when necessary.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms “approximately”, “about”, “substantially”, and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term “exemplary” as used herein to describe various embodiments is intended to indicate that such embodiments are possible examples, representations, and/or illustrations of possible embodiments (and such term is not intended to connote that such embodiments are necessarily extraordinary or superlative examples).

The terms “coupled,” “connected,” and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., “top,” “bottom,” “above,” “below,” “between,” etc.) are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is coupled to the processor to form a processing circuit and includes computer code for executing (e.g., by the processor) the one or more processes described herein.

It is important to note that the construction and arrangement of the electromechanical variable transmission as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A lift device comprising:

a base having a plurality of wheels;

a retractable lift mechanism having a first end coupled to the base and being movable between an extended position and a retracted position;

a work platform configured to support a load, the work platform being coupled to and supported by a second end of the retractable lift mechanism;

a linear actuator configured to selectively move the retractable lift mechanism between the extended position and the retracted position, the linear actuator having an electric motor;

an electromagnetic brake coupled to the linear actuator and movable between an engaged position and a disengaged position, wherein the electromagnetic brake includes a friction disk, an armature, and a wire coil, the friction disk is rotationally coupled to a rotor of the electric motor of the linear actuator; and a manual release device configured to manually move the electromagnetic brake from the engaged position to the disengaged position, wherein the manual release device includes a manual pull handle configured to pull a cable fixed to the armature, thereby moving the electromagnetic brake from the engaged position into the disengaged position, in the event of a power failure, the electromagnetic brake is biased toward the engaged position, where the armature is biased into contact with the friction disk by at least one engagement spring, thereby preventing rotation of the friction disk, and in the disengaged position, a current is applied to the wire coil to produce an electromagnetic force on the armature that overcomes a spring force of the at least one engagement spring, thereby compressing the at least one engagement spring, pulling the armature out of contact with the friction disk, and allowing the rotation of the friction disk.

2. The lift device of claim 1, wherein the electric motor is a DC shut motor including one or more terminals, wherein when the electromagnetic brake is moved into the disengaged position by the manual release device, the one or more terminals are biased toward a shunted position and the DC shut motor acts as a generator to reduce a rotational speed of the rotor of the electric motor and, thereby, reduce a speed at which the retractable lift mechanism is moved toward the retracted position.

3. The lift device of claim 1, wherein the electric motor is a permanent magnet motor including one or more terminals, wherein when the electromagnetic brake is moved into the disengaged position by the manual release device, the one or more terminals are biased toward a shunted position and the permanent magnet motor acts as a generator to reduce a rotational speed of the rotor of the electric motor and, thereby, reduce a speed at which the retractable lift mechanism is moved toward the retracted position.

4. The lift device of claim 1, wherein the electric motor includes one or more terminals, wherein when the electromagnetic brake is moved into the disengaged position by the manual release device, the one or more terminals are biased toward a shunted position and the electric motor acts as a generator to reduce a rotational speed of the rotor of the electric motor and, thereby, reduce a speed at which the retractable lift mechanism is moved toward the retracted position.

5. The lift device of claim 1, wherein the linear actuator is arranged between the base and the work platform.

6. The lift device of claim 1, further comprising a descent control mechanism configured to reduce a speed at which the retractable lift mechanism is moved from the extended position to the retracted position.

7. The lift device of claim 6, wherein the descent control mechanism is a centrifugal brake rotationally coupled to the rotor of the electric motor.

8. The lift device of claim 1, wherein the electric motor of the linear actuator of is a permanent magnet motor having terminals that are biased toward a shunted position, such that, in the event of the power failure, when the electromagnetic brake is moved into the disengaged position by the manual release device and the work platform is being lowered, the permanent magnet motor acts as a generator, electromagnetically reducing a rotational speed of the rotor of the electric motor and, thereby, reducing a speed at which the retractable lift mechanism is moved from the extended position to the retracted position.

9. A lift device comprising:

a base having a plurality of wheels;

a battery arranged within the base;

a retractable lift mechanism having a first end coupled to the base and being moveable between an extended position and a retracted position;

a work platform configured to support a load, the work platform being coupled to and supported by a second end of the retractable lift mechanism;

a linear actuator configured to selectively move the retractable lift mechanism between the extended position and the retracted position, the linear actuator having an electric motor;

an electromagnetic brake coupled to the linear actuator and movable between an engaged position and a disengaged position; and a manual release device configured to manually move the electromagnetic brake from the engaged position to the disengaged position, wherein the electric motor of the linear actuator is biased into a shunted configuration, so that, in the event of the battery being fully discharged or a power failure and the electromagnetic brake is moved into the disengaged position by the manual release device, the electric motor acts as a generator to electromagnetically reduce a rotational speed of a rotor of the electric motor and, thereby, reduce a speed at which the retractable lift mechanism is moved toward the retracted position.

10. The lift device of claim 9, further comprising a descent control mechanism in the form of a centrifugal brake rotationally coupled to the rotor.

11. The lift device of claim 10, wherein the centrifugal brake is configured to reduce the rotational speed of the rotor once the rotor exceeds a predetermined rotational speed.

12. The lift device of claim 11, wherein the predetermined rotational speed is between 1850 rpm and 2250 rpm.

13. The lift device of claim 9, wherein the linear actuator is arranged between the base and the work platform.

14. The lift device of claim 9, wherein the electric motor is a DC shunt motor.

15. The lift device of claim 9, wherein the electric motor is a permanent magnet motor.

16. A lift device comprising:

a base having a plurality of wheels;

a battery arranged within the base;

a retractable lift mechanism having a first end coupled to the base and being moveable between an extended position and a retracted position;

a work platform configured to support a load, the work platform being coupled to and supported by a second end of the retractable lift mechanism;

a linear actuator configured to selectively move the retractable lift mechanism between the extended position and the retracted position, the linear actuator having an electric motor;

an electromagnetic brake coupled to the linear actuator and movable between an engaged position and a disengaged position; and a manual release device configured to manually move the electromagnetic brake from the engaged position to the disengaged position, wherein the electric motor of the linear actuator is configured such that, in response to the battery being fully discharged or a power failure, the electric motor acts as a generator to electromagnetically reduce the electric motor and, thereby, reduce a speed at which the retractable lift mechanism is moved toward the retracted position.

17. The lift device of claim 16, wherein the electromagnetic brake includes a pressure plate, a friction disk, an armature, a magnetic body, and a wire coil, the friction disk is rotationally coupled to a rotor of the electric motor of the linear actuator and is disposed between the armature and the pressure plate, and the armature is disposed between the magnetic body and the friction disk.

18. The lift device of claim 17, wherein, in the engaged position, the armature is biased away from the magnetic body and into contact with the friction disk by at least one engagement spring, thereby preventing rotation of the friction disk, and, in the disengaged position, a current is applied to the wire coil to produce an electromagnetic force on the armature that overcomes a spring force of the at least one engagement spring, thereby compressing the at least one engagement spring, pulling the armature out of contact with the friction disk, and allowing the rotation of the friction disk.

19. The lift device of claim 18, further comprising a descent control mechanism in the form of a centrifugal brake rotationally coupled to the rotor of the electric motor of the linear actuator.

20. The lift device of claim 16, wherein the linear actuator is arranged between the base and the work platform.

* * * * *